Patented May 10, 1927.

1,627,939

UNITED STATES PATENT OFFICE.

JOHN P. TRICKEY, OF EVANSTON, ILLINOIS, ASSIGNOR TO THE QUAKER OATS COMPANY, OF CHICAGO, ILLINOIS, A CORPORATION OF NEW JERSEY.

PROCESS OF COLORING MATERIALS.

No Drawing. Application filed January 2, 1923, Serial No. 610,351. Renewed March 23, 1927.

My invention relates to improvements in colored fabricated articles and to processes for coloring such materials and it has special reference to methods for forming color in situ in fabricated articles or in raw materials for manufacturing operations.

More particularly my present invention pertains to a process for producing color in situ in materials such as wood, molded products, lacquers, enamels, veneers and the like.

Heretofore in coloring molded articles, and especially in order to color such articles black, pigments, such as carbon black, or expensive dyestuffs have been generally employed. When pigments have been used, it has been found that they have a detrimental effect upon the strength of the finished products. In industrial arts, it is usual to color molded articles black for very obvious reasons. My present invention is directed particularly to furnishing means, as well as a suitable agent, for imparting a lustrous black color to such articles.

An object, therefore, of my present invention is to provide a new process for imparting a brilliant black color to wood, molded articles and the like without deleteriously affecting the strength, finish or other quality of such articles and it has a further object of producing a fabricated article in which the coloring is produced in situ and uniformly distributed in order to color homogeneously the article. By means of my present invention, coloring may be imparted to articles in a very economical and readily controllable manner without deleteriously affecting the articles in any way.

I have ascertained that by heating furfural (furfuraldehyde) in the presence of a small amount of acid agent the furfural (furfuraldehyde) is transformed into a black substance of considerable physical strength and of high tinctorial power.

I have also ascertained that when furfural is mixed with a plastic compound having a faintly acid reaction, such as the resin formed by the reaction of phenol and sulphur chloride, and that when this resin, either with or without a suitable filler, is heated to form an insoluble, infusible body, the final fabricated product possesses a deep brilliant and lustrous black color. Moreover, I have ascertained that by the introduction of furfural into such fabricated products the strength of the material is increased rather than decreased.

In practicing my present invention, and particularly with reference to the manufacture of molded articles, I add to a batch of material containing 600 pounds of phenol and two thirds of the sulphur chloride necessary to complete the reaction about 3½ pounds of furfural, either all at once or in small amounts during the introduction of the remaining one third of the additionally required sulphur chloride. The heat of reaction will, in this circumstance, usually be sufficient to form a homogeneous black color in situ although the furfural not transformed at this stage will be transformed during the heat curing process to which the phenol resin is subjected after being mixed with the filler and pressed.

In this manner the phenolic or synthetic resin composition is formed in the presence of the color imparting substance that, in turn, is formed simultaneously with the formation of the synthetic resin by a reaction in situ which is a reaction independent of the reaction forming the synthetic resin and involves only the furfural and an acid agent. In using my present process in connection with other plastic materials or in lacquers or enamels it is necessary only to add the furfural at such point in the process of manufacture that the furfural will be subjected to a reaction temperature in an acid medium which will result in the transformation of the furfural in situ into the black coloring agent.

In lacquers or enamels which are to be baked, the addition of furfural is especially useful since it not only imparts a highly brilliant and uniform black color but it also adds to the finish and durability of the surface of the coating.

I have also ascertained that furfural is an excellent coloring agent for wood and similar materials which can be readily colored by impregnating them with furfural, either pure or in solution, together with a small quantity of an acid agent and then subjecting these materials to a heat treatment for a sufficient period of time in order that a black color may be formed in situ and uniformly distributed. This result may also be produced by treating the wood with furfural and also an acid agent, either liquid or gaseous.

In instances where the material to be treated is readily susceptible to damage by heat, I have found it desirable to add to the furfural a small amount of aniline oil because this enables the reaction of the furfural to be completed at a lower temperature. It is further possible to bring about this reaction of furfural thereby producing the black color without the aid of heat if a sufficient concentration of the acid agent—to wit 1% of hydrochloric acid or its equivalent—be present.

From the foregoing, it will be obvious that my method of producing black coloring in fabricated articles, as well as raw materials, is applicable to a very wide range of materials used as binders, such as phenol-formaldehyde resin (the reaction product of phenol and a methylene-containing reagent), asphalts (which are not sufficiently black in themselves), shellac, rosin, varnish and the like,—whenever such articles or materials are subjected to heat in at least a slightly acid medium during the manufacture of the final product.

The use of furfural (furfuraldehyde) as the color imparting substance, and particularly when employed in compositions formed from phenol and the like, is to be distinguished from the known use of furfural in combination with phenol for producing a condensation product or synthetic resin. My present invention contemplates that the proportion of furfural employed be sufficient only to serve as the color imparting substance by reason of the furfural reacting in situ independently of the phenol and by a reaction involving only the furfural and an acid.

While I have described my invention it is to be understood that I do not desire to be limited to any of the specific details outlined above other than those pointed out in the appended claims.

What I claim as new and desire to secure by Letters Patent is:—

1. The process for coloring materials which comprises treating them with furfural, and then causing the furfural to impart color to said materials by an independent reaction in situ involving only the furfural and an acid agent.

2. The process for coloring materials which comprises treating them with furfural, and then subjecting the materials to heat in the presence of an acid agent whereby the furfural may impart a black color to the materials by reason of an independent reaction in situ of said furfural and said acid agent.

3. The process for coloring materials which comprises treating them with furfural, and then subjecting the materials to heat in the presence of a catalytic agent which causes an independent reaction in situ involving only said furfural and said reaction agent.

4. The process of producing a blank color in a fabricated product which comprises treating it with acidified furfural, and then subjecting the product to heat whereby a black color is produced in the product by reason of an independent reaction in situ involving only said acidified furfural.

5. The process of imparting a black coloring to molded articles which comprises treating the molding material with furfural, rendering such material slightly acid, and then subjecting the material to the action of heat thereby causing said furfural independently to react in situ to impart said black coloring action.

6. The process of imparting a black coloring to an article which comprises treating the article with furfural, rendering the furfural at least slightly acid, and then subjecting the treated article to the action of heat thereby causing said furfural independently to react in situ to impart said black coloring action.

7. An article of manufacture colored by a reaction product of furfural, said furfural having independently reacted in situ by a reaction involving only said furfural and an acid agent.

8. Process of preparing homogeneously colored synthetic resin compositions, comprising synthesizing the synthetic resin in the presence of furfural that imparts the color to said resin composition by a reaction with itself in situ independently of the materials comprising said synthetic resin.

In witness whereof, I have hereunto subscribed my name.

JOHN P. TRICKEY.

In instances where the material to be treated is readily susceptible to damage by heat, I have found it desirable to add to the furfural a small amount of aniline oil because this enables the reaction of the furfural to be completed at a lower temperature. It is further possible to bring about this reaction of furfural thereby producing the black color without the aid of heat if a sufficient concentration of the acid agent—to wit 1% of hydrochloric acid or its equivalent—be present.

From the foregoing, it will be obvious that my method of producing black coloring in fabricated articles, as well as raw materials, is applicable to a very wide range of materials used as binders, such as phenol-formaldehyde resin (the reaction product of phenol and a methylene-containing reagent), asphalts (which are not sufficiently black in themselves), shellac, rosin, varnish and the like,—whenever such articles or materials are subjected to heat in at least a slightly acid medium during the manufacture of the final product.

The use of furfural (furfuraldehyde) as the color imparting substance, and particularly when employed in compositions formed from phenol and the like, is to be distinguished from the known use of furfural in combination with phenol for producing a condensation product or synthetic resin. My present invention contemplates that the proportion of furfural employed be sufficient only to serve as the color imparting substance by reason of the furfural reacting in situ independently of the phenol and by a reaction involving only the furfural and an acid.

While I have described my invention it is to be understood that I do not desire to be limited to any of the specific details outlined above other than those pointed out in the appended claims.

What I claim as new and desire to secure by Letters Patent is:—

1. The process for coloring materials which comprises treating them with furfural, and then causing the furfural to impart color to said materials by an independent reaction in situ involving only the furfural and an acid agent.

2. The process for coloring materials which comprises treating them with furfural, and then subjecting the materials to heat in the presence of an acid agent whereby the furfural may impart a black color to the materials by reason of an independent reaction in situ of said furfural and said acid agent.

3. The process for coloring materials which comprises treating them with furfural, and then subjecting the materials to heat in the presence of a catalytic agent which causes an independent reaction in situ involving only said furfural and said reaction agent.

4. The process of producing a blank color in a fabricated product which comprises treating it with acidified furfural, and then subjecting the product to heat whereby a black color is produced in the product by reason of an independent reaction in situ involving only said acidified furfural.

5. The process of imparting a black coloring to molded articles which comprises treating the molding material with furfural, rendering such material slightly acid, and then subjecting the material to the action of heat thereby causing said furfural independently to react in situ to impart said black coloring action.

6. The process of imparting a black coloring to an article which comprises treating the article with furfural, rendering the furfural at least slightly acid, and then subjecting the treated article to the action of heat thereby causing said furfural independently to react in situ to impart said black coloring action.

7. An article of manufacture colored by a reaction product of furfural, said furfural having independently reacted in situ by a reaction involving only said furfural and an acid agent.

8. Process of preparing homogeneously colored synthetic resin compositions, comprising synthesizing the synthetic resin in the presence of furfural that imparts the color to said resin composition by a reaction with itself in situ independently of the materials comprising said synthetic resin.

In witness whereof, I have hereunto subscribed my name.

JOHN P. TRICKEY.

Certificate of Correction.

Patent No. 1,627,939.      Granted May 10, 1927, to

JOHN P. TRICKEY.

It is hereby certified that error appears in the printed specification of the above-numbered patent requiring correction as follows: Page 2, line 68, claim 4, for the word "blank" read *black;* and that the said Letters Patent should be read with this correction therein that the same may conform to the record of the case in the Patent Office.

Signed and sealed this 21st day of June, A. D. 1927.

[SEAL.]

M. J. MOORE,
*Acting Commissioner of Patents.*

Certificate of Correction.

Patent No. 1,627,939.                                   Granted May 10, 1927, to

JOHN P. TRICKEY.

It is hereby certified that error appears in the printed specification of the above-numbered patent requiring correction as follows: Page 2, line 68, claim 4, for the word "blank" read *black;* and that the said Letters Patent should be read with this correction therein that the same may conform to the record of the case in the Patent Office.

Signed and sealed this 21st day of June, A. D. 1927.

[SEAL.]                                                                  M. J. MOORE,
*Acting Commissioner of Patents.*